United States Patent
Binek et al.

(10) Patent No.: US 11,936,091 B2
(45) Date of Patent: Mar. 19, 2024

(54) WAVEGUIDE APPARATUS INCLUDING CHANNEL SEGMENTS HAVING SURFACES THAT ARE ANGULARLY JOINED AT A JUNCTION OR A CORNER

(71) Applicant: Raytheon Technologies Corporation, Farmington, CT (US)

(72) Inventors: Lawrence A. Binek, Glastonbury, CT (US); Gurkan Gok, Milford, CT (US)

(73) Assignee: RTX CORPORATION, Farmington, CT (US)

( * ) Notice: Subject to any disclaimer, the term of this patent is extended or adjusted under 35 U.S.C. 154(b) by 623 days.

(21) Appl. No.: 17/119,316

(22) Filed: Dec. 11, 2020

(65) Prior Publication Data

US 2022/0190460 A1 Jun. 16, 2022

(51) Int. Cl.
*H01P 5/12* (2006.01)
*H01P 1/02* (2006.01)
*B64D 27/10* (2006.01)

(52) U.S. Cl.
CPC ............. *H01P 5/12* (2013.01); *H01P 1/022* (2013.01); *B64D 27/10* (2013.01)

(58) Field of Classification Search
CPC .......... H01P 1/022; H01P 1/025; H01P 1/027; H01P 1/161; H01P 5/12; H01P 3/12
USPC ................................................ 333/249, 125
See application file for complete search history.

(56) References Cited

U.S. PATENT DOCUMENTS

| | | | | |
|---|---|---|---|---|
| 2,640,877 A | * | 6/1953 | Miller et al. | H01P 1/027 333/249 |
| 2,810,111 A | * | 10/1957 | Cohn | H01P 1/025 174/117 R |
| 3,150,333 A | * | 9/1964 | Bowman | H01P 5/082 343/756 |
| 3,659,234 A | * | 4/1972 | Schuttloffel et al. | H01P 3/14 333/241 |
| 4,642,586 A | | 2/1987 | Fowler | |
| 7,019,603 B2 | * | 3/2006 | Yoneda et al. | H01P 11/002 333/125 |
| 9,784,827 B2 | | 10/2017 | Shepard | |
| 10,096,880 B2 | | 10/2018 | Zhu | |
| 10,307,138 B2 | | 6/2019 | Heims | |
| 10,573,949 B2 | | 2/2020 | Fluitt | |
| 10,751,988 B1 | | 8/2020 | Snyder | |
| 2010/0102899 A1 | | 4/2010 | Engel | |

(Continued)

OTHER PUBLICATIONS

Alessandri et al. "Rigorous Analysis of Compensated E-Plane Junctions in Rectangular Waveguide", Microwave Symposium Digest, vol. 2, May 16, 1995, pp. 987-990.

(Continued)

*Primary Examiner* — Benny T Lee
(74) *Attorney, Agent, or Firm* — Getz Balich LLC (57) ABSTRACT

An apparatus is provided for signal communication. This signal communication apparatus includes a waveguide with an internal channel. The internal channel includes a plurality of channel segments interconnected at a junction. The waveguide includes a first surface and a second surface. The first surface and the second surface partially form a peripheral boundary of the internal channel at the junction. The first surface meets the second surface at a first corner. The first surface is angularly offset from the second surface by an obtuse angle.

15 Claims, 11 Drawing Sheets

(56) References Cited

U.S. PATENT DOCUMENTS

2013/0265733 A1* 10/2013 Herbsommer et al. ...................... H01P 5/107
361/774
2017/0025726 A1* 1/2017 Gomi et al. ............ H01P 1/025
2018/0183129 A1 6/2018 Gritters
2018/0366800 A1 12/2018 Sysouphat

OTHER PUBLICATIONS

Genc et al. "Fabrication of Three-Dimensional Printed Rectangular Waveguide T-Junction with In-Phase and Equal Power Division", Microwave and Optical Technology Letters, vol. 60, No. 8, Jun. 15, 2018, pp. 2043-2048.

Yamamoto et al. "Numerical Analysis of H-Plane Waveguide Junctions by Using Densely Arrayed Electric Line Currents", Antennas and Propagation Society International Symposium, Jul. 5, 2008, pp. 1-4.

EP search report for EP21214151.9 dated Mar. 23, 2022.

* cited by examiner

WAVEGUIDE APPARATUS INCLUDING CHANNEL SEGMENTS HAVING SURFACES THAT ARE ANGULARLY JOINED AT A JUNCTION OR A CORNER

BACKGROUND OF THE DISCLOSURE

1. Technical Field

This disclosure relates generally to an equipment operation system and, more particularly, to a waveguide for communicating signals between nodes of the equipment operation system.

2. Background Information

Equipment such as a gas turbine engine may include various electronic components configured in signal communication with one another through a wiring harness. A typical wiring harness includes a multitude of wires for providing signal paths between the electronic components. One or more of these wires are connected to a respective electronic component through a connector. However, if one or more connectors are not fully seated or mated with the wrong components, the turbine engine and its electronic components may not properly function. Furthermore, a typical wiring harness takes up valuable peripheral space about the gas turbine engine. There is a need in the art therefore for an improved signal communication system which may reduce or obviate the need for wire connectors and/or free up space about the gas turbine engine.

SUMMARY OF THE DISCLOSURE

According to an aspect of the present disclosure, an apparatus is provided for signal communication. This signal communication apparatus includes a waveguide with an internal channel. The internal channel includes a plurality of channel segments interconnected at a junction. The waveguide includes a first surface and a second surface. The first surface and the second surface partially form a peripheral boundary of the internal channel at the junction. The first surface meets the second surface at a first corner. The first surface is angularly offset from the second surface by an obtuse angle.

According to another aspect of the present disclosure, another apparatus is provided for signal communication. This signal communication apparatus includes a waveguide. The waveguide includes an internal channel and a notched corner. The internal channel includes a first channel segment and a second channel segment that meets the first channel segment at a junction. The notched corner is located at the junction.

According to another aspect of the present disclosure, another apparatus is provided for signal communication. This signal communication apparatus includes a waveguide. The waveguide includes an internal channel, an indent feature and a sidewall. The internal channel includes a first channel segment, a second channel segment and a third channel segment that are interconnected at a junction. The indent feature is arranged at the junction opposite the second channel segment. The indent feature projects out from the sidewall. The indent feature has a tapered sectional geometry.

According to still another aspect of the present disclosure, a method is provided for manufacturing the apparatus for signal communication. During this method, the waveguide is formed by additive manufacturing.

The notched corner may meet a first sidewall surface that partially forms the first channel segment at a first V-shaped interface. The notched corner may meet a second sidewall surface that partially forms the second channel segment at a second V-shaped interface.

The indent feature may include a first surface and a second surface that meets the first surface at a distal edge of the indent feature. The first surface may be angularly offset from the second surface by an angle between sixty four degrees and one hundred and sixteen degrees.

The obtuse angle may be between one hundred and twenty two degrees and one hundred and forty eight degrees.

The obtuse angle may be about one hundred and thirty five degrees.

The first corner may be an interior corner.

The waveguide may also include a third surface that further forms the peripheral boundary of the internal channel at the junction. The third surface may meet the second surface at a second corner. The second surface may be angularly offset from the third surface by an angle between sixty four degrees and one hundred and sixteen degrees.

The angle may be about or exactly ninety degrees.

The second corner may be an interior corner.

The second corner may be an exterior corner.

The waveguide may also include a fourth surface that further forms the peripheral boundary of the internal channel at the junction. The fourth surface may meet the third surface at a third corner. The third surface may be angularly offset from the fourth surface by an obtuse angle.

The first surface may be parallel with the fourth surface.

The first surface may be coplanar with the fourth surface.

The second surface may partially form a corner at the junction between a first of the channel segments and a second of the channel segments.

The waveguide may include an indent feature located at the junction opposite a first of the channel segments. The indent feature may include the second surface.

The junction may be configured as a T-junction.

At least a portion of the internal channel may have a lobed cross-sectional geometry.

The signal communication apparatus may also include a first transceiver and a second transceiver. The second transceiver may be configured in signal communication with the first transceiver through the internal channel The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
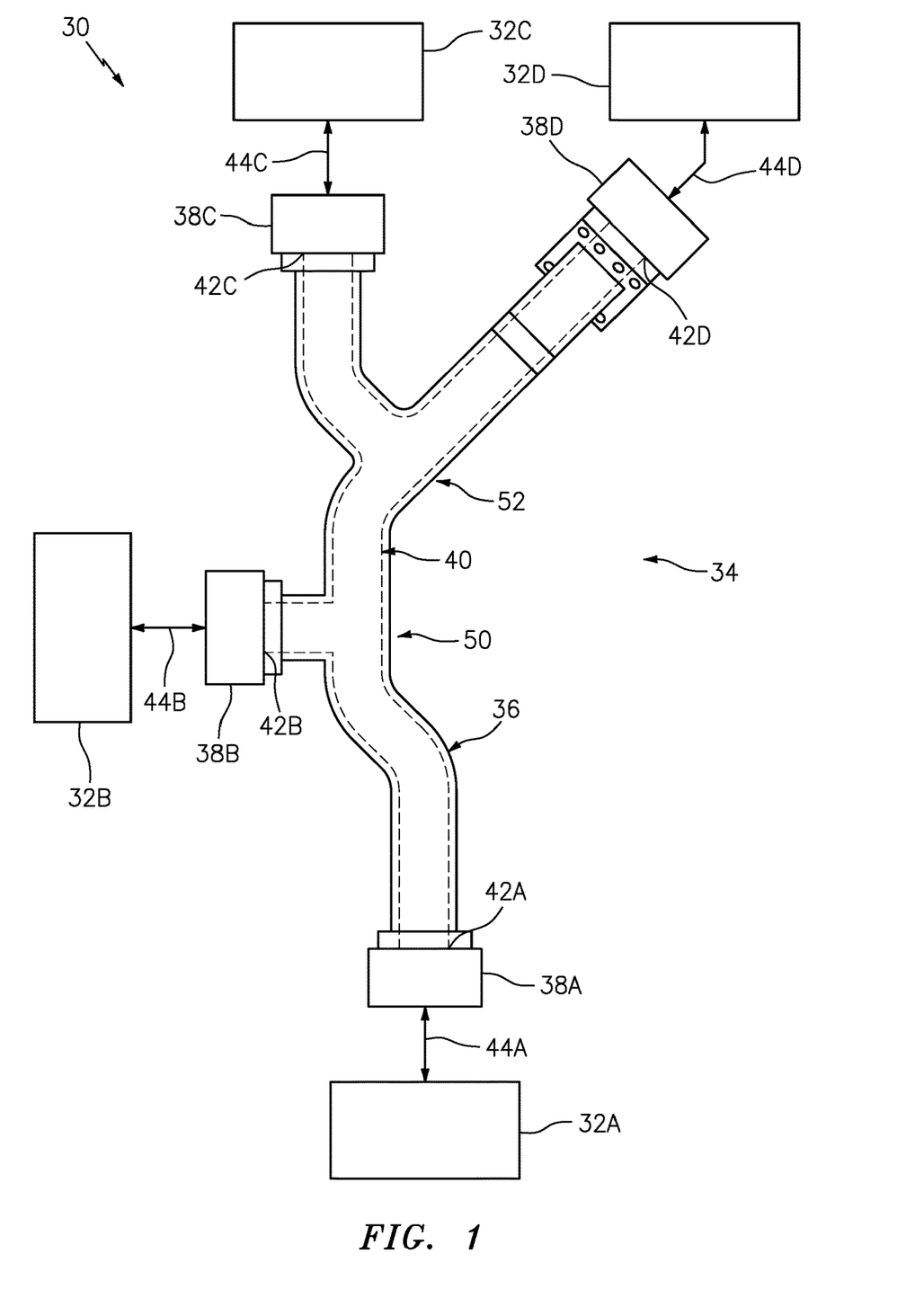
FIG. 1 is an illustration of an equipment operation system.

FIG. 1 illustrates an operation system 30 for equipment such as, but not limited to, a gas turbine engine. This equipment operation system 30 may be configured as or included in a control system, a sensor system and/or a communication system. The equipment operation system 30 of FIG. 1 includes a plurality of system devices 32A-32D (generally referred to as 32) and a signal communication apparatus 34 for facilitating communication between the system devices 32.

The system devices 32 may include a controller (e.g., an electronic control module (ECM)) and one or more sensors (e.g., probes). Examples of the sensors include, but are not limited to, a speed sensor, a power sensor, a temperature sensor (e.g., an exhaust gas temperature (EGT) sensor), a pressure sensor and a flow sensor. The system devices 32 may also or alternatively include one or more actuators. Examples of the actuators include, but are not limited to, an electronic valve for actuating a hydraulic or pneumatic device, an electronic pump for actuating a hydraulic or pneumatic device, and an electronic switch for actuating an electric motor. The system devices 32 may also or alternatively include one or more electronic ignition devices. Examples of the electronic ignition devices include, but are not limited to, electric spark ignition engine start devices and electronic pyro flare engine start devices. Of course, various other types of sensors, actuators and, more generally, system devices are known in the art, and the present disclosure is not limited to any particular ones thereof.

The signal communication apparatus 34 of FIG. 1 includes a multi-path waveguide 36 and a plurality of transceivers 38A-38D (generally referred to as 38); e.g., input/output devices. The waveguide 36 is configured with at least one internal channel 40 (e.g., an internal waveguide passage) within the waveguide 36. This internal waveguide channel 40 is configured to provide a signal path for electric, magnetic and/or electromagnetic signal waves (e.g., radio frequency (RF) waves) between two or more waveguide portals 42A-42D (generally referred to as 42) of the waveguide 36. The term waveguide portal may describe a signal input and/or output port for coupling at least one transceiver to a waveguide channel. One or more of the waveguide portals 42, for example, may each be configured as an aperture (e.g., a through hole) that extends through a portion (e.g., flanged coupling, wall, etc.) of the waveguide 36 and that is fluidly coupled with the internal waveguide channel 40.

The transceivers 38 are respectively configured in signal communication with (e.g., hardwired and/or wirelessly coupled to) at least one of the system devices 32. Each of the transceivers 38A, 38B, 38C, 38D of FIG. 1, for example, is configured in signal communication with a respective one of the system devices 32A, 32B, 32C, 32D through an electrical conduit 44A, 44B, 44C, 44D (generally referred to as 44); e.g., a bundle of one or more wires. Each of the transceivers 38A, 38B, 38C, 38D is also arranged and/or mated with a respective one of the waveguide portals 42A, 42B, 42C, 42D. Each of the transceivers 38 may thereby: (A) receive a signal from the respective system device 32; and (B) convert the received signal into signal wave(s) for transmission within the internal waveguide channel 40 to one or more of the other transceivers 38. Each of the transceivers 38 may also or alternatively thereby: (A) receive signal wave(s) transmitted through the internal waveguide channel 40 from one or more of the other transceivers 38; and (B) convert the received signal wave(s) into a signal for transmission to the respective system device 32 through, for example, the electrical conduit 44.

The waveguide 36 may be configured as a monolithic body. Herein, the term "monolithic" may describe an apparatus which is formed as a single unitary body. An entirety of the waveguide 36 of FIG. 1, for example, may be additively manufactured, cast, machined and/or otherwise formed as a single unitary body. For example, the waveguide 36 may be built up in a layer-by-layer fashion using an additive manufacturing process and an additive manufacturing device. Examples of the additive manufacturing process include a laser powder bed fusion (LPBF) process and an electron beam powder bed fusion (EBPBF) process. Examples of the additive manufacturing device include a laser powder bed fusion (LPBF) device and an electron beam powder bed fusion (EBPBF) device. Of course, various other additive manufacturing processes and devices are known in the art, and the present disclosure is not limited to any particular ones thereof. By contrast, a non-monolithic body may include discretely formed waveguide members, where the waveguide members are mechanically fastened and/or otherwise attached to one another post formation to provide a waveguide.

When using a formation process such as, but not limited to, additive manufacturing, one or more portions of a multi-path waveguide may be partially or completely unsupported during at least a portion of the formation process. The term "unsupported" may describe a portion of a waveguide that is unsupported (e.g., vertically/perpendicular relative to a build plane) during at least a portion of the formation process. For example, an unsupported portion of a waveguide may overlap (relative to the build plane) a void (e.g., a channel, a cavity, an opening, etc.), where the void is located vertically beneath the unsupported portion. In another example, an unsupported portion of a waveguide may overlap (relative to the build plane) unsolidified material (e.g., powder), where the unsolidified material is located beneath the unsupported portion. Such unsupported portions of a waveguide may be subject to formation defects such as, but not limited to: material sagging and/or other material deformation; non-specified porosity (e.g., porosity that is higher or lower than specified in a design for the waveguide); non-specified surface finish (e.g., surface finish that is rougher than specified in a design for the waveguide); internal flaws; etc.

To mitigate formation defects, one or more (e.g., temporary or permanent) support structures may be integrated with the waveguide to support one or more of the otherwise unsupported portions of the respective support structure(s). In general, these support structures are arranged outside of the waveguide so as to reduce or eliminate the need to remove material from within an internal channel of the waveguide post formation. Access to surfaces and/or features internal to a waveguide post formation may be difficult with conventional (e.g., line-of-sight) post-processing techniques (e.g., machining, surface finishing, etc.), particularly where the waveguide is formed as a monolithic body. Therefore, one or more internal portion 46 and 48 of the waveguide 36 of FIG. 2 have supportless configurations. The term "supportless" may describe a structural configuration (e.g., shape, size, location, orientation, etc.) of a feature (e.g., an overhang feature) that provides self-support during formation. For example, each layer of material being solidified during additive manufacturing of the feature may be supported by a previously solidified layer without requiring an additional support structure as discussed below in further detail. Provision of the self-supporting internal portions 46 and 48 may therefore reduce or eliminate a need for post processing techniques within the internal waveguide channel 40.

Figure 2:
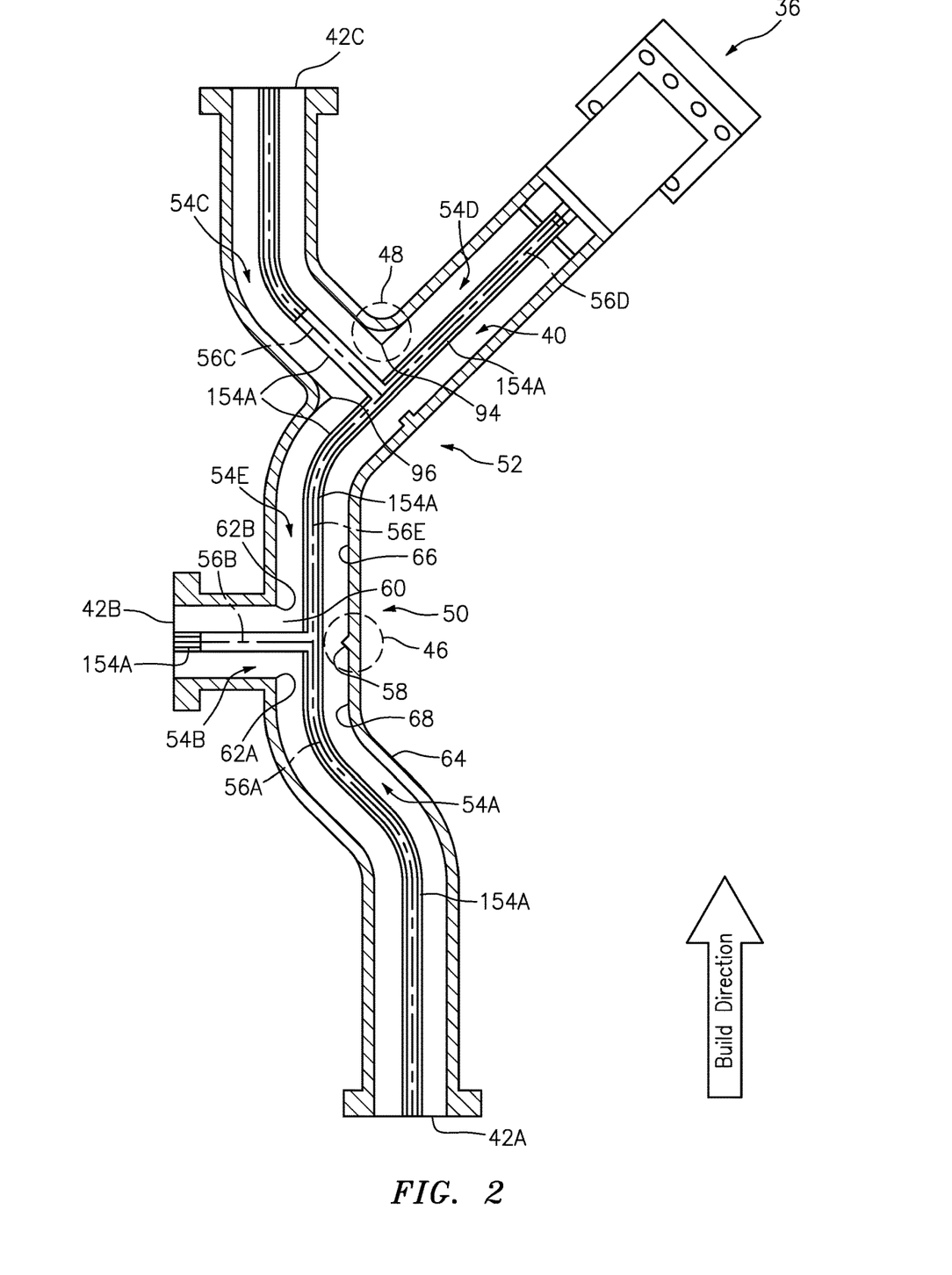
FIG. 2 is a side sectional illustration of a waveguide for the equipment operation system.

The self-supporting internal portions 46 and 48 of the waveguide 36 of FIG. 2 are respectively configured at junctions 50 and 52 (e.g., connections, nodes, etc.) between respective segments 54A-54E (generally referred to as 54) of the internal waveguide channel 40. One or more of these channel segments (e.g., 54A, 54B, 54C and 54D) may be arranged at, extend towards a respective end/waveguide portal (e.g., 42A, 42B, 42C and 42D; see also FIG. 1) of the waveguide 36. These channel segments 54A-54D are therefore referred to below as "end segments" for ease of description. At least one of the channel segments (e.g., 54E) may be arranged intermediately between/extend between the junctions 50 and 52. This channel segment 54E is therefore referred to below as an "intermediate segment" for ease of description.

The first end segment 54A, the second end segment 54B and the intermediate segment 54E are interconnected at the first junction 50; e.g., a T-junction such as a magic tee junction (also known as a "magic T junction"). The first end segment 54A extends, projects out/away from the first junction 50 towards the first transceiver 38A (see FIG. 1); e.g., to the first waveguide portal 42A. The second end segment 54B extends, projects out/away from the first junction 50 towards the second transceiver 38B (see FIG. 1); e.g., to the second waveguide portal 42B. The intermediate segment 54E extends, projects out/away from the first junction 50 towards (e.g., to) the second junction 52. With this arrangement, the second end segment 54B may form a base of the first junction 50 (e.g., a base of the T), and the first end segment 54A and the intermediate segment 54E may form arms of a top of the first junction 50 (e.g., a top of the T). At the first junction 50, a centerline 56A of the first end segment 54A may be parallel (e.g., coaxial) with a centerline 56E of the intermediate segment 54E. The first end segment centerline 56A may be angularly offset from (e.g., perpendicular to) a centerline 56B of the second end segment 54B. The present disclosure, however, is not limited to the foregoing exemplary waveguide channel segment arrangement. For example, in other embodiments, the first end segment centerline 56A may be non-parallel with (e.g., angularly offset from) the second end segment centerline 56B. The first end segment centerline 56A may also or alternatively be angularly offset from the second end segment centerline 56B and/or the intermediate segment centerline 56E by a non-ninety degree angle; e.g., an acute or obtuse angle.

The intermediate segment 54E, the third end segment 54C and the fourth end segment 54D are interconnected at the second junction 52; e.g., a T-junction such as a magic tee junction. The intermediate segment 54E extends, projects out/away from the second junction 52 towards (e.g., to) the first junction 50 in the internal waveguide channel 40. The third end segment 54C extends, projects out/away from the second junction 52 towards the third transceiver 32C (see FIG. 1); e.g., to the third waveguide portal 42C. The fourth end segment 54D extends, projects out/away from the second junction 52 towards the fourth transceiver 32D (see FIG. 1); e.g., to the fourth waveguide portal 42D (see FIG. 1). With this arrangement, the third end segment 54C may form a base of the second junction 52 (e.g., a base of the T), and the fourth end segment 54D and the intermediate segment 54E may form arms of a top of the second junction 52 (e.g., a top of the T). At the second junction 52, the intermediate segment centerline 56E may be parallel (e.g., coaxial) with a centerline 56D of the fourth end segment 54D. The intermediate segment centerline 56E may be angularly offset from (e.g., perpendicular to) a centerline 56C of the third end segment 54C. The present disclosure, however, is not limited to the foregoing exemplary waveguide channel segment arrangement. For example, in other embodiments, the intermediate segment centerline 56E may be non-parallel with (e.g., angularly offset from) the fourth end segment centerline 56D. The intermediate segment centerline 56E may also or alternatively be angularly offset from the third end segment centerline 56C and/or the fourth segment centerline by a non-ninety degree angle; e.g., an acute or obtuse angle.

The first internal portion 46 of the waveguide 36 is arranged at the first junction 50. This first internal portion 46 is configured as or otherwise includes a protrusion 58. The protrusion 58 of FIG. 2 is configured as an indent feature. The protrusion 58, for example, is configured to provide impedance matching between the channel segments 54A, 54B and/or 54E.

The protrusion 58 is arranged opposite a junction end 60 of the second end segment 54B at the first junction 50. The protrusion 58 of FIG. 2, for example, is located intermediately (e.g., centrally) between two exterior corners 62A and 62B (e.g., convex corners) of the waveguide 36 at the first junction 50. The vertically lower waveguide corner 62A is formed where the first end segment 54A meets the second end segment 54B. The vertically upper waveguide corner 62B is formed where the second end segment 54B meets the intermediate segment 54E.

The protrusion 58 is arranged along and is connected to a sidewall 64 of the waveguide 36 at the first junction 50. This waveguide sidewall 64 includes (e.g., carries) an intermediate segment surface 66 and a first end segment surface 68. The intermediate segment surface 66 partially forms a side peripheral boundary of the intermediate segment 54E. The first end segment surface 68 partially forms a side peripheral boundary of the first end segment 54A. This first end segment surface 68 of FIG. 2 is arranged parallel (e.g., coplanar) with the intermediate segment surface 66 at the first junction 50; however, the present disclosure is not limited to such an arrangement.

Figure 3:
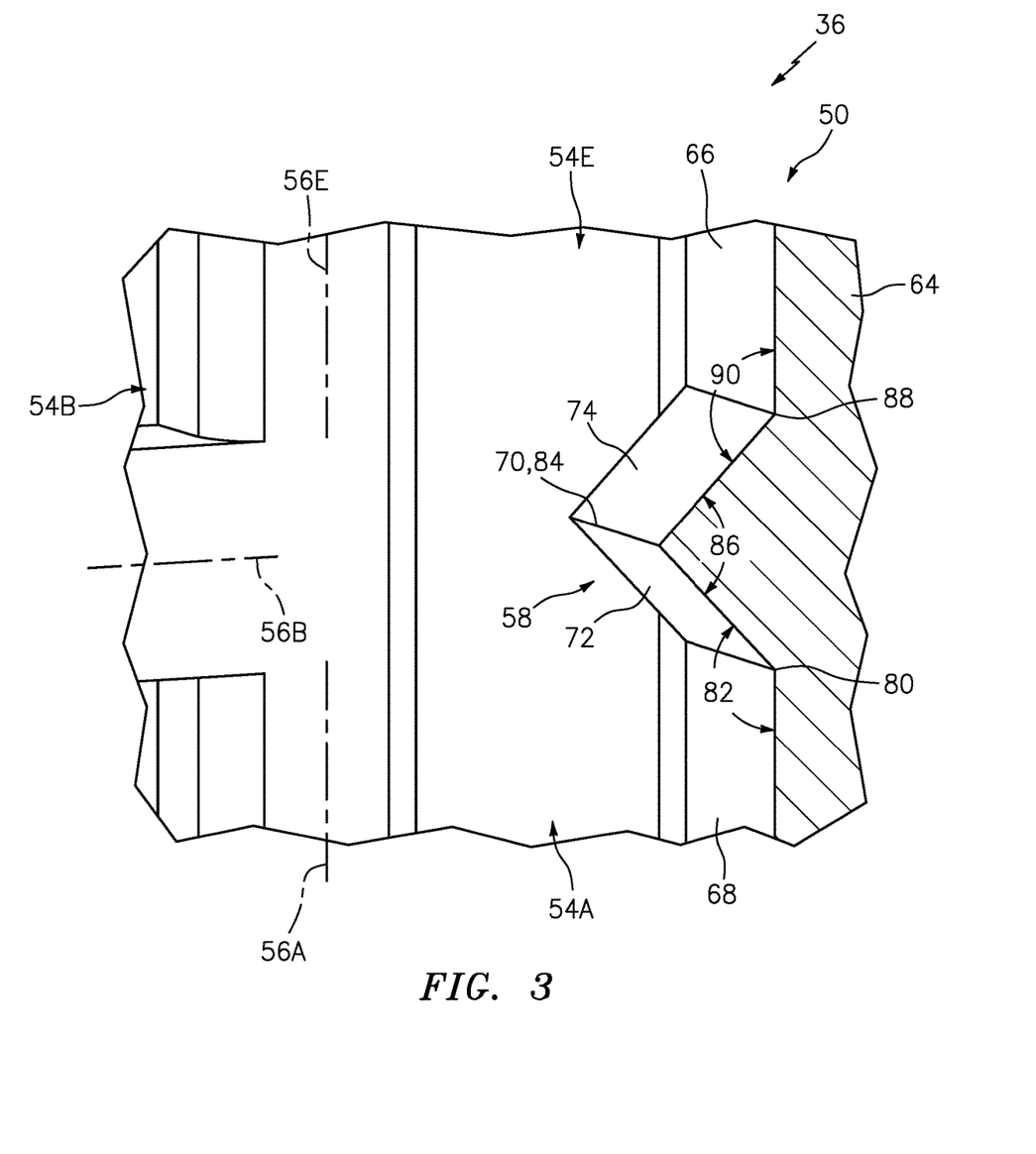
FIG. 3 is a perspective side sectional illustration of a portion of the waveguide with an indent feature.

Referring to FIG. 3, the protrusion 58 projects laterally (e.g., widthwise) out from the waveguide sidewall 64 and its the surfaces 66 and 68 to a distal end 70 of the protrusion 58. The protrusion 58 includes (e.g., carries) a first protrusion surface 72 and a second protrusion surface 74.

Figure 4:
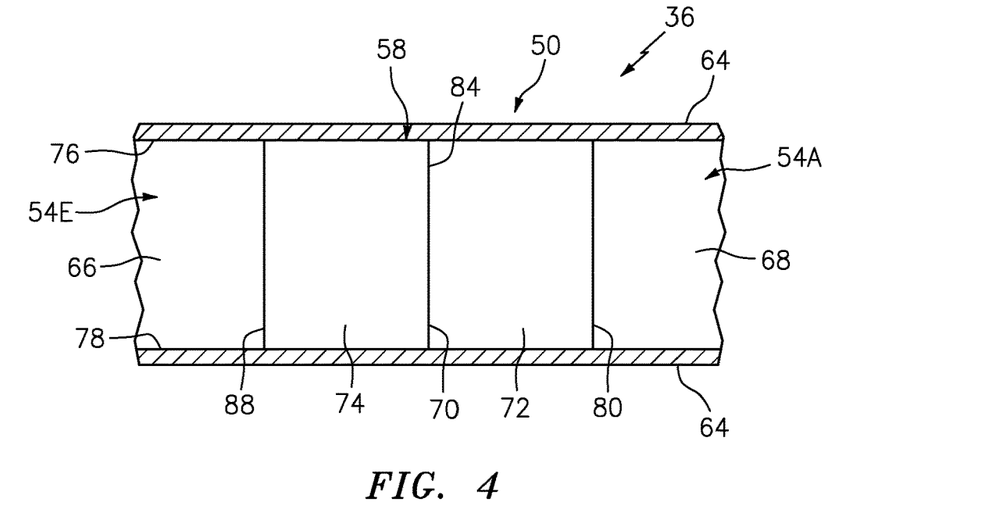
FIG. 4 is a cross-sectional illustration of a portion of the waveguide with the indent feature.

Referring to FIG. 4, each of the protrusion surfaces 72 and 74 extends transversely (e.g., depthwise) between and to opposing (e.g., top and bottom) sides 76 and 78 of the waveguide sidewall 64 at the first junction 50. Thus, the protrusion 58 extends transversely across the internal waveguide channel 40.

Referring to FIG. 3, the first protrusion surface 72 extends between and to the first end segment surface 68 and the second protrusion surface 74. More particularly, the first protrusion surface 72 meets the first end segment surface 68 at a first interior corner 80; e.g., a concave straight-line interface. The first protrusion surface 72 is angularly offset from the first end segment surface 68 by an included angle 82; e.g., an obtuse angle. This angle 82 may be between one hundred and twenty two degrees (122°) and one hundred and forty degrees (140°); e.g., the angle 82 may be about (e.g., +/−1°) one hundred and thirty five degrees (135°). The first protrusion surface 72 meets the second protrusion surface 74 at an exterior corner 84; e.g., a convex straight-line interface/edge of the protrusion 58 at its distal end 70. The first protrusion surface 72 is angularly offset from the second protrusion surface 74 by an included angle 86; e.g., a right angle, or an acute or obtuse angle. This angle 86 may be between sixty four degrees (64°) and one hundred and sixteen degrees (116°); e.g., the angle 86 may be about (e.g., +/−1°) ninety degrees (90°). The protrusion 58 thereby tapers (e.g., in a longitudinal direction relative to the centerlines 56A and 56E) as the protrusion 58 projects laterally to its distal end 70. The protrusion 58 of FIG. 3, more particularly, has a tapered (e.g., triangular) sectional geometry, for example, when viewed in a plane defined by two or more of the centerlines (e.g., 56A and 56B, 56B and 56E) at the first junction 50.

The second protrusion surface 74 extends between and to the intermediate segment surface 66 and the first protrusion surface 72. More particularly, the second protrusion surface 74 meets the intermediate segment surface 66 at a second interior corner 88; e.g., a concave straight-line interface. The second protrusion surface 74 is angularly offset from the intermediate segment surface 66 by an included angle 90; e.g., an obtuse angle. This angle 90 may be equal to (or different than) the angle 82. The angle 90, for example, may be between one hundred and twenty two degrees (122°) and one hundred and forty degrees (140°); e.g., the angle 90 may be about (e.g., +/−1°) one hundred and thirty five degrees (135°).

Figure 5:
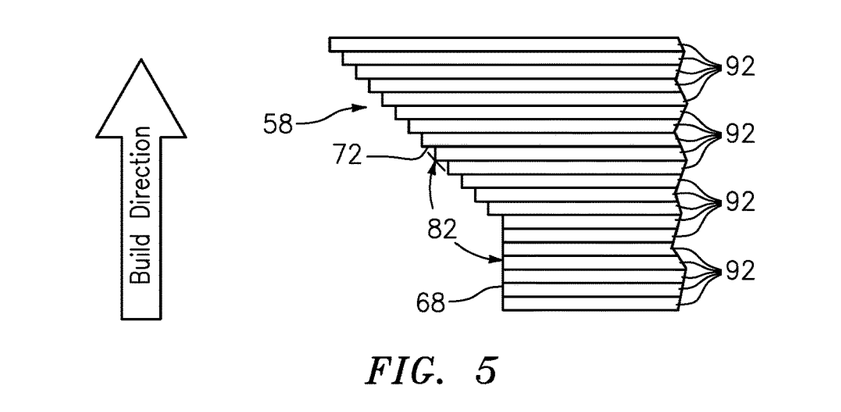
FIG. 5 is a side sectional illustration of a portion of the waveguide with the indent feature schematically depicting layer-by-layer additive manufacture.

With the foregoing configuration, the protrusion 58 may be self-supported during formation. For example, referring to FIG. 5, in a build direction an overhanging portion of each layer of material 92 forming the protrusion 58 may be at least partially supported by a previous layer of material 92 there beneath given the angle 82 between the surfaces 68 and 72. The protrusion 58 of FIG. 3 may therefore be formed without use of one or more additional support structures within the waveguide 36. Furthermore, the protrusion 58 is configured with symmetry by providing a similar/common angle between the surfaces 66 and 74 as between the surfaces 68 and 72.

Figure 6:
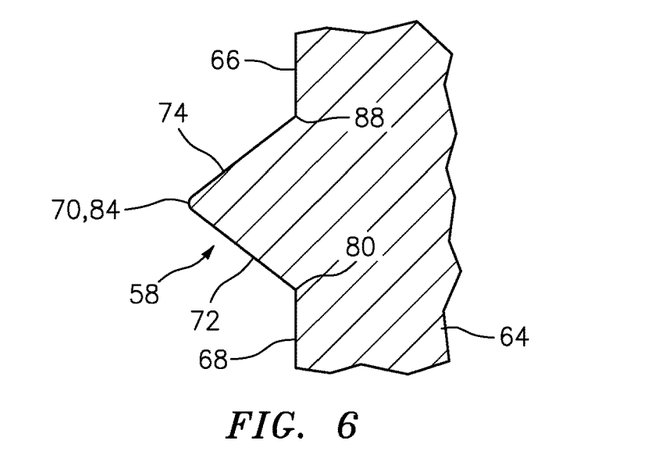
FIG. 6 is a side sectional illustration of a portion of the waveguide with the indent feature, which indent feature is configured with an eased exterior corner.

In some embodiments, the corner 84 between the protrusion surfaces 72 and 74 may be a sharp corner. In other embodiments, referring to FIG. 6, the corner 84 between the protrusion surfaces 72 and 74 may be an eased (e.g., rounded, chamfered, etc.) corner. One or more of the corners 80, 88 may also or alternatively be eased or sharp.

Referring to FIG. 2, the second internal portion 48 of the waveguide 36 is arranged at the second junction 52. This second internal portion 48 is configured as or otherwise includes a vertically upper, exterior corner 94 (e.g., convex corner) of the waveguide 36. This upper waveguide corner 94 is arranged opposite a vertically lower, exterior corner 96 (e.g., convex corner) of the waveguide 36. This lower waveguide corner 96 is formed where the intermediate segment 54E meets the third end segment 54C. The upper waveguide corner 94 is formed where the third end segment 54C meets the fourth end segment 54D.

Figure 7:
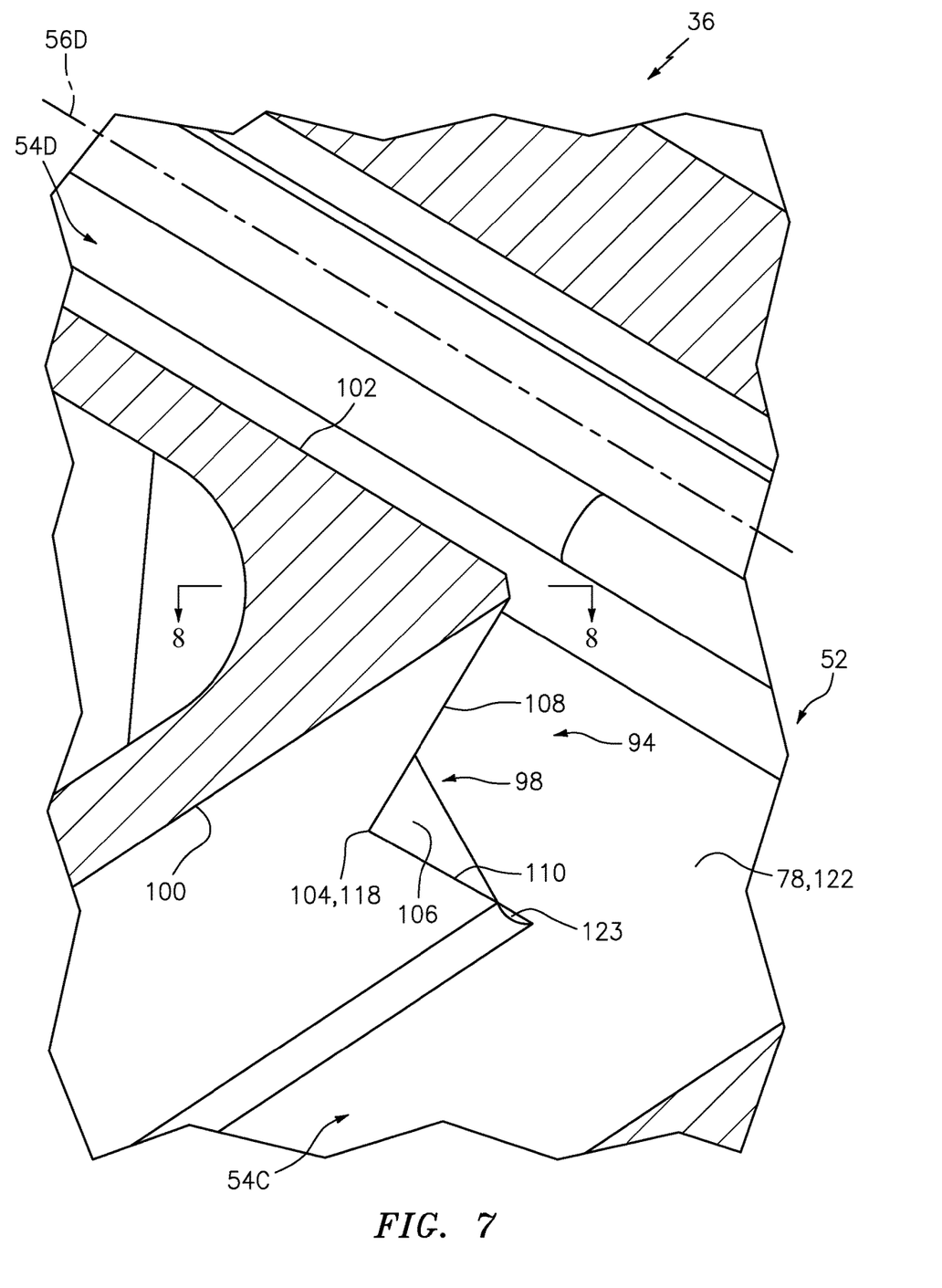
FIG. 7 is a perspective side sectional illustration of a portion of the waveguide with a notched corner.
Figure 8:
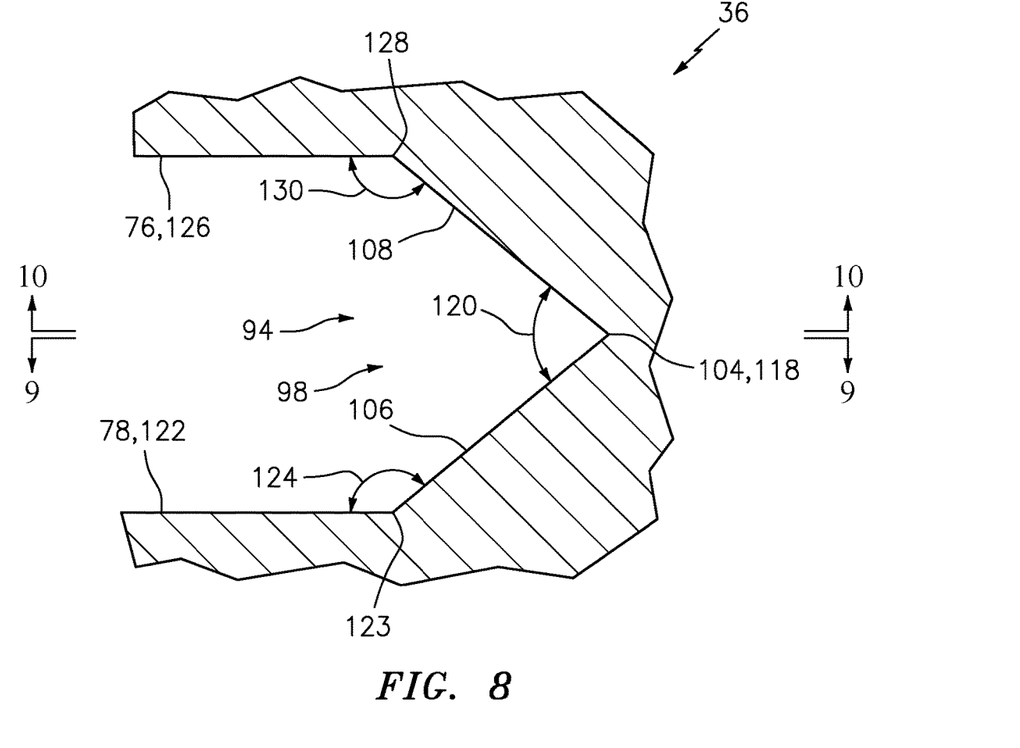
FIG. 8 is a cross-sectional illustration of a portion of the waveguide with the notched corner taken along line 8-8 in FIG. 7.
Figure 9:
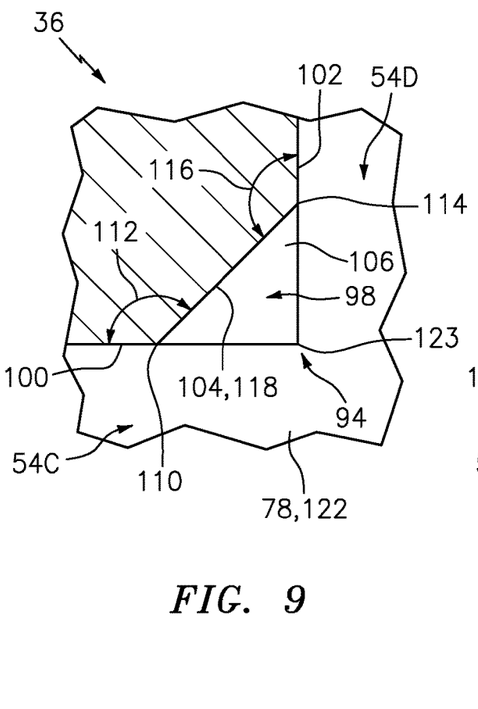
FIG. 9 is a side sectional illustration of a portion of the waveguide with the notched corner taken along line 9-9 in FIG. 8.
Figure 10:
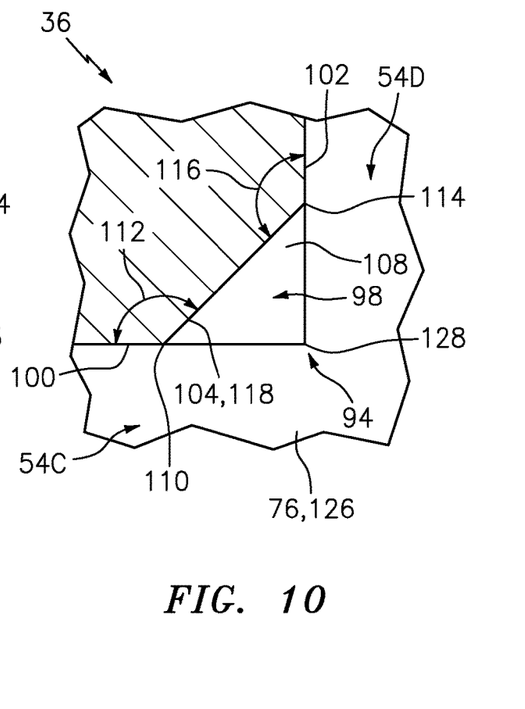
FIG. 10 is a side sectional illustration of a portion of the waveguide with the notched corner taken along line 10-10 in FIG. 8.

The upper waveguide corner 94 of FIGS. 7 and 8 is configured as a notched corner. The waveguide 36 of FIGS. 7 and 8, for example, is configured with a tapered notch 98. Referring to FIGS. 7, 9 and 10, the tapered notch 98 projects laterally into the waveguide 36 at the corner 94 from internal surfaces 100 and 102 of the waveguide 36 to a distal end 104 of the notch 98. The third end segment surface 100 partially forms a side peripheral boundary of the third end segment 54C. The fourth end segment surface 102 partially forms a side peripheral boundary of the fourth end segment 54D.

The tapered notch 98 is formed by a first notch surface 106 (see FIG. 9) and a second notch surface 108 (see FIG. 10). Each of these notch surfaces 106 and 108 extends laterally between and to the surfaces 100 and 102. Each of the notch surfaces 106 and 108, for example, meets the third end segment surface 100 at an exterior corner 110; e.g., a convex V-shaped interface/edge between the surfaces 106, 108 and 100. At this exterior corner 110, referring to FIGS. 9 and 10, each notch surface 106, 108 is angularly offset from the third end segment surface 100 by an angle 112; e.g., an obtuse angle. This angle 112 may be between one hundred and twenty five degrees (125°) and one hundred and forty five degrees (145°); e.g., the angle 112 may be about (e.g., +/−1°) one hundred and thirty five degrees (135°). Each of the notch surfaces 106 and 108 of FIG. 7 meets the fourth end segment surface 102 at an exterior corner 114; e.g., a convex V-shaped interface/edge between the surfaces 106, 108 and 102. At this exterior corner 114, referring to FIGS. 9 and 10, each notch surface 106, 108 is angularly offset from the fourth end segment surface 102 by an angle 116; e.g., an obtuse angle. This angle 116 may be between one hundred and twenty five degrees (125°) and one hundred and forty five degrees (145°); e.g., the angle 116 may be about (e.g., +/−1°) one hundred and thirty five degrees (135°).

Referring to FIGS. 7 and 8, the first notch surface 106 meets the second notch surface 108 at an interior corner 118; e.g., a concave straight-line interface between the surfaces 106 and 108. At this interior corner 118, referring to FIG. 8, the first notch surface 106 is angularly offset from the second notch surface 108 by an included angle 120; e.g., a right angle, or an acute or obtuse angle. This angle 120 may be between sixty four degrees (64°) and one hundred and sixteen degrees (116°); e.g., the angle 120 may be about (e.g., +/−1°) ninety degrees (90°).

Referring to FIGS. 8 and 9, the first notch surface 106 extends diagonally (e.g., laterally and transversely) between and to the interior corner 118 and a base (e.g., bottom) surface 122 of the waveguide 36 at the waveguide side 78. As the first notch surface 106 extends from the interior corner 118 to the base surface 122, the first notch surface 106 laterally tapers. The first notch surface 106 therefore may have a tapered (e.g., triangular) geometry when viewed, for example, in a plane parallel with the first notch surface 106. The first notch surface 106 of FIG. 7 meets the base surface 122 at, for example, a point/an interior corner 123. Referring to FIG. 8, the first notch surface 106 is angularly offset from the base surface 122 at the corner 123 by an included angle 124; e.g., an obtuse angle. This angle 124 may be between one hundred and twenty two degrees (122°) and one hundred and forty degrees (140°); e.g., the angle 124 may be about (e.g., +/−1°) one hundred and thirty five degrees (135°).

Referring to FIGS. 8 and 10, the second notch surface 108 extends diagonally (e.g., laterally and transversely) between and to the interior corner 118 and a base (e.g., top) surface 126 of the waveguide 36 at the waveguide side 76. Referring to FIG. 10, as the second notch surface 108 extends from the interior corner 118 to the base surface 126, the second notch surface 108 laterally tapers. The second notch surface 108 therefore may have a tapered (e.g., triangular) geometry when viewed, for example, in a plane parallel with the second notch surface 108. The second notch surface 108 of FIG. 8 meets the base surface 126 at a point/an interior corner 128. The second notch surface 108 is angularly offset from the base surface 126 at the corner 128 by an included angle 130; e.g., an obtuse angle. This angle 130 may be between one hundred and twenty two degrees (122°) and one hundred and forty degrees (140°); e.g., the angle 130 may be about (e.g., +/−1°) one hundred and thirty five degrees (135°).

Figure 11:
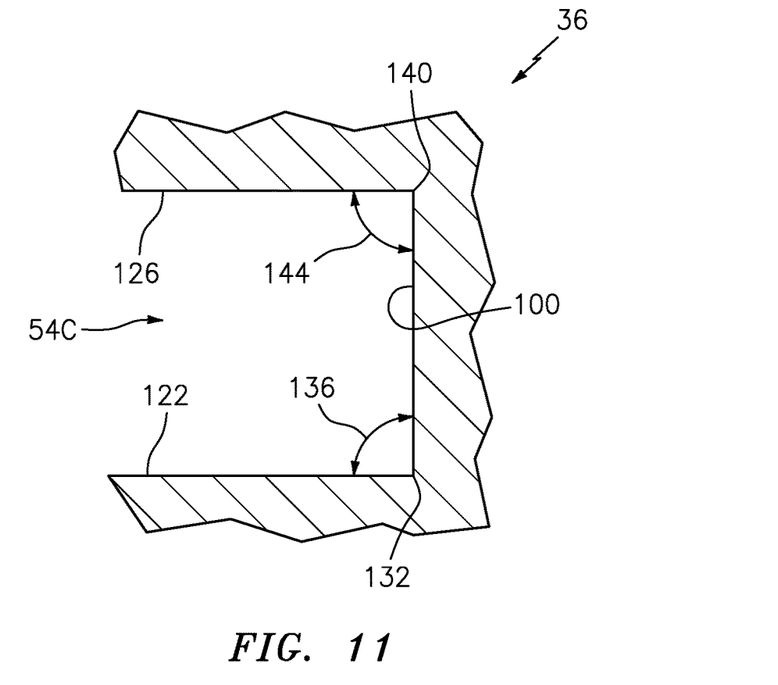
FIG. 11 is a cross-sectional illustration of a portion of the waveguide to one side of the notched corner.
Figure 12:
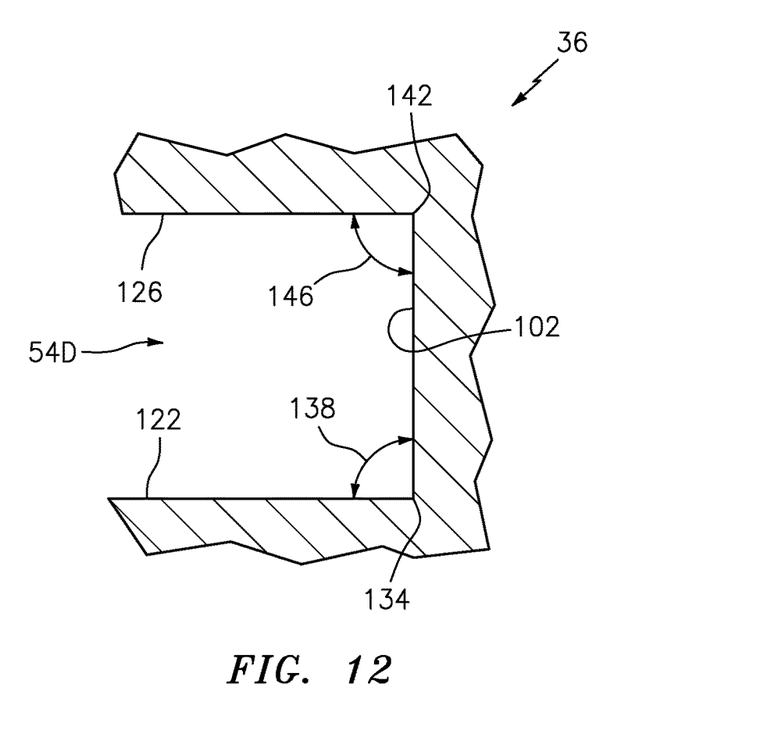
FIG. 12 is a cross-sectional illustration of a portion of the waveguide to another side of the notched corner.

Referring to FIGS. 11 and 12, each of the internal waveguide surfaces 100 and 102 extends transversely between and to the opposing base surfaces 122 and 126 along the respective exterior corners 110 and 114 (see FIGS. 9 and 10), where the internal waveguide surface 100 is shown in FIG. 11 and the internal waveguide surface 102 is shown in FIG. 12. Each of the internal waveguide surfaces 100 and 102 meets the base surface 122 at an interior corner 132, 134, where the interior corner 132 is shown in FIG. 11 and the interior corner 134 is shown in FIG. 12. Each of the internal waveguide surfaces 100 and 102 is angularly offset from the base surface 122 by an included angle 136, 138, where the included angle 136 is shown in FIG. 11 and the included angle 138 is shown in FIG. 12. This angle 136, 138 may be about (e.g., +/−1°) ninety degrees (90°). Similarly, each of the internal waveguide surfaces 100 and 102 meets the base surface 126 at an interior corner 140, 142, where the interior corner 140 is shown in FIG. 11 and the interior corner 142 is shown in FIG. 12. Each of the internal waveguide surfaces 100 and 102 is angularly offset from the base surface 126 by an included angle 144, 146, where the included angle 144 is shown in FIG. 11 and the included angle 146 is shown in FIG. 12. This angle 144, 146 may be about (e.g., +/−1°) ninety degrees (90°). With such an arrangement, the bases surfaces 122 and 126 may be parallel with, but transversely displaced from one another.

Figure 13:
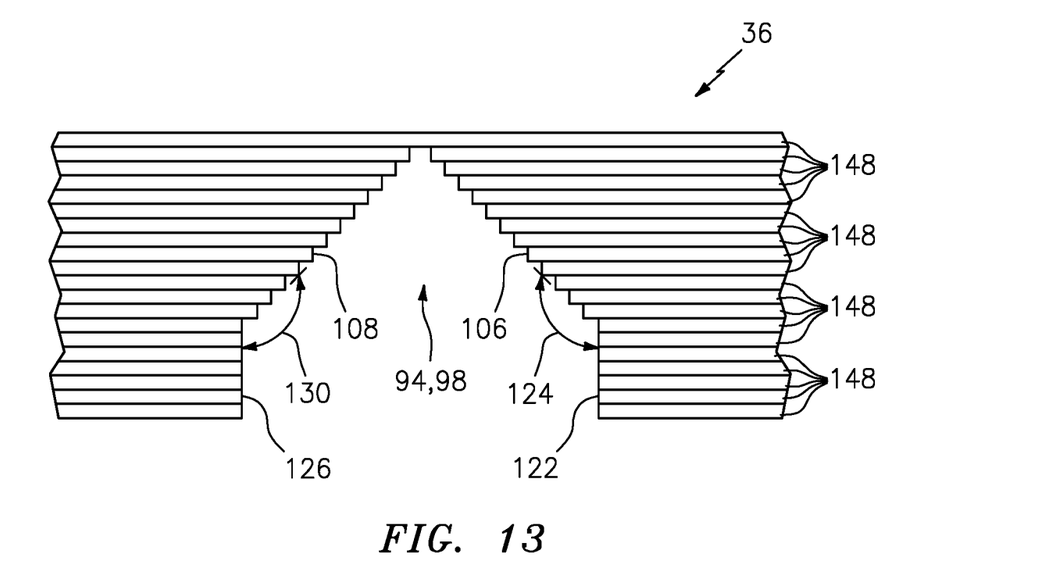
FIG. 13 is a side sectional illustration of a portion of the waveguide with the notched corner schematically depicting layer-by-layer additive manufacture.

With the foregoing configuration, the second internal portion 48 of the waveguide 36 may be self-supported during formation. For example, referring to FIG. 13, an overhanging portion of each layer of material 148 forming the upper waveguide corner 94 may be at least partially supported by a previous layer of material 148 there beneath given the angle 124, 130 between the surfaces 106 and 122, 108 and 126. The upper waveguide corner 94 may therefore be formed without use of one or more additional support structures within the waveguide 36.

Figure 14:
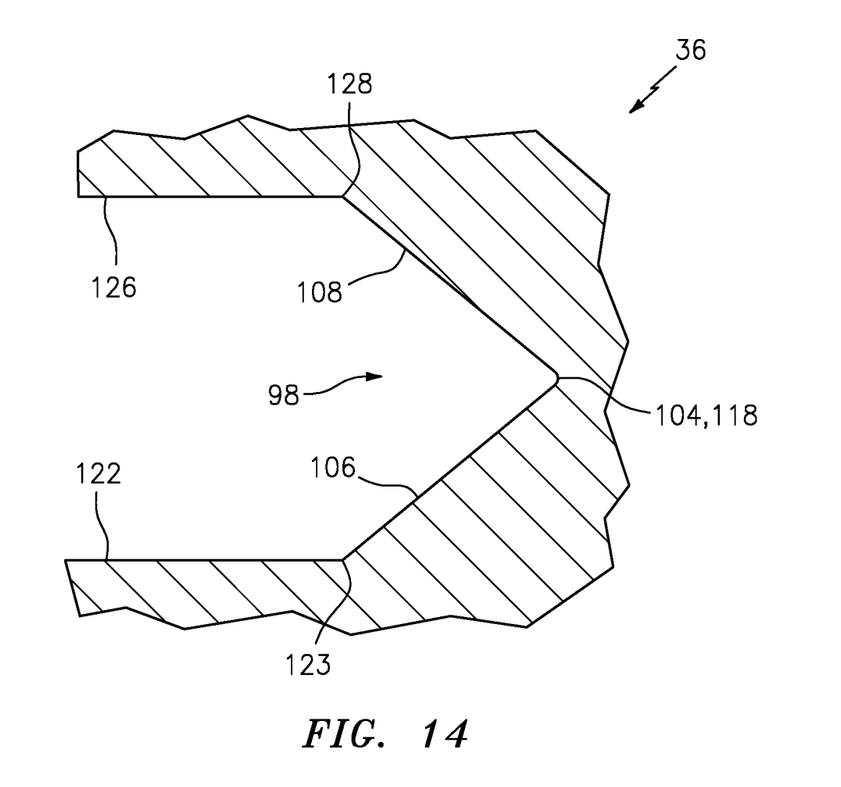
FIG. 14 is a cross-sectional illustration of a portion of the waveguide with the notched corner, which notched corner is configured with an eased interior corner.

Referring to FIG. 8, in some embodiments, the corner 118 between the notch surfaces 106 and 108 may be a sharp corner. In other embodiments, referring to FIG. 14, the corner 118 between the notch surfaces 106 and 108 may be an eased (e.g., rounded, chamfered, etc.) corner. One or more of the corners 123, 128 may also or alternatively be eased or sharp.

Figure 15:
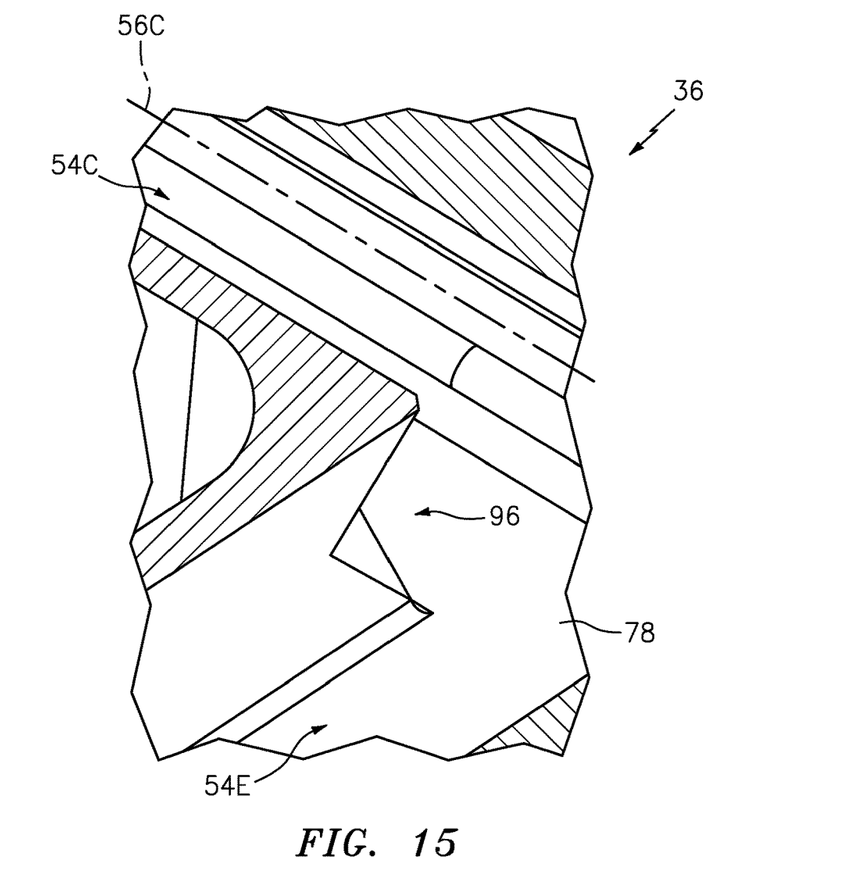
FIG. 15 is a perspective side sectional illustration of a portion of the waveguide with another notched corner.

Referring to FIG. 2, to provide symmetry at the second junction 52, the lower waveguide corner 96 may also be configured as a notched corner. For example, referring to FIGS. 2 and 15, the lower waveguide corner 96 may be configured as a mirror image of the upper waveguide corner 94 (see FIG. 7). The present disclosure, however, is not limited to such a symmetrical configuration.

Each of the surfaces within the waveguide and bordering the internal waveguide channel 40 (e.g., the surfaces 66, 68, 72, 74, 100, 102, 106, 108, 122 and 126) is an internal surface of the waveguide 36. Each of these internal waveguide surfaces partially forms a peripheral boundary of the internal waveguide channel 40 through the waveguide 36.

Figures 16, 17:
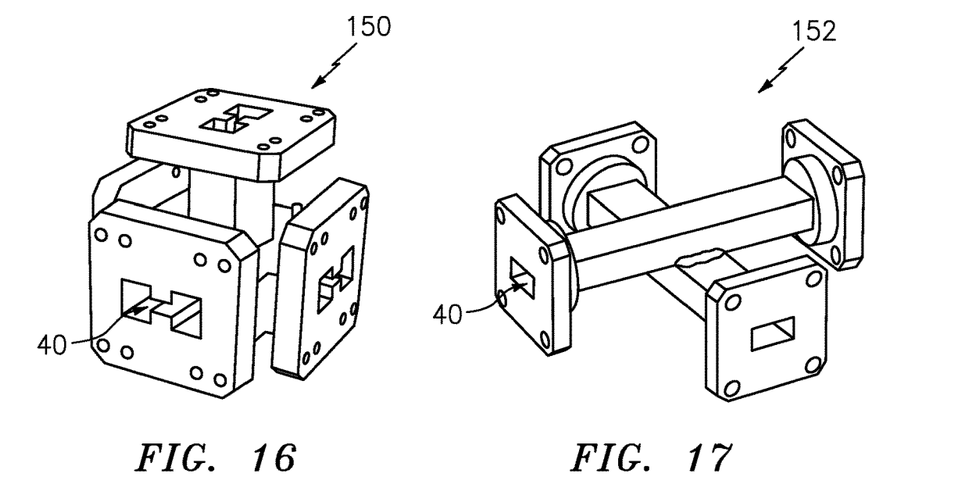
FIG. 16 is a perspective illustration of a waveguide with a hybrid T-junction.
FIG. 17 is a perspective illustration of a waveguide with a cross-guide junction.

While the junctions 50 and 52 are described above as T-junctions between three segments of the internal waveguide channel 40, the configurations of the self-supporting internal waveguide portions 46 and 48 may be applied to other types and configurations of junctions. For example, the notched corner(s) and/or the indent features described above may also or alternatively be configured at an L-junction, an E-junction, a V-junction, a K-junction, an X-junction, a hybrid T-junction, a cross guide junction, etc. Some examples of such alternative junctions 150 and 152 are respectively shown in FIGS. 16 and 17.

While the waveguide channel segments 54A-54D are described above as end segments, one or more of these segments 54A, 54B, 54C, 54D may alternatively be configured as an intermediate segment. In addition or alternatively, while the waveguide channel segment 54E is described above as an intermediate segment, this segment 54E may alternatively be configured as an end segment. The present disclosure therefore is not limited to the exemplary waveguide configuration of FIG. 2.

Figure 18:
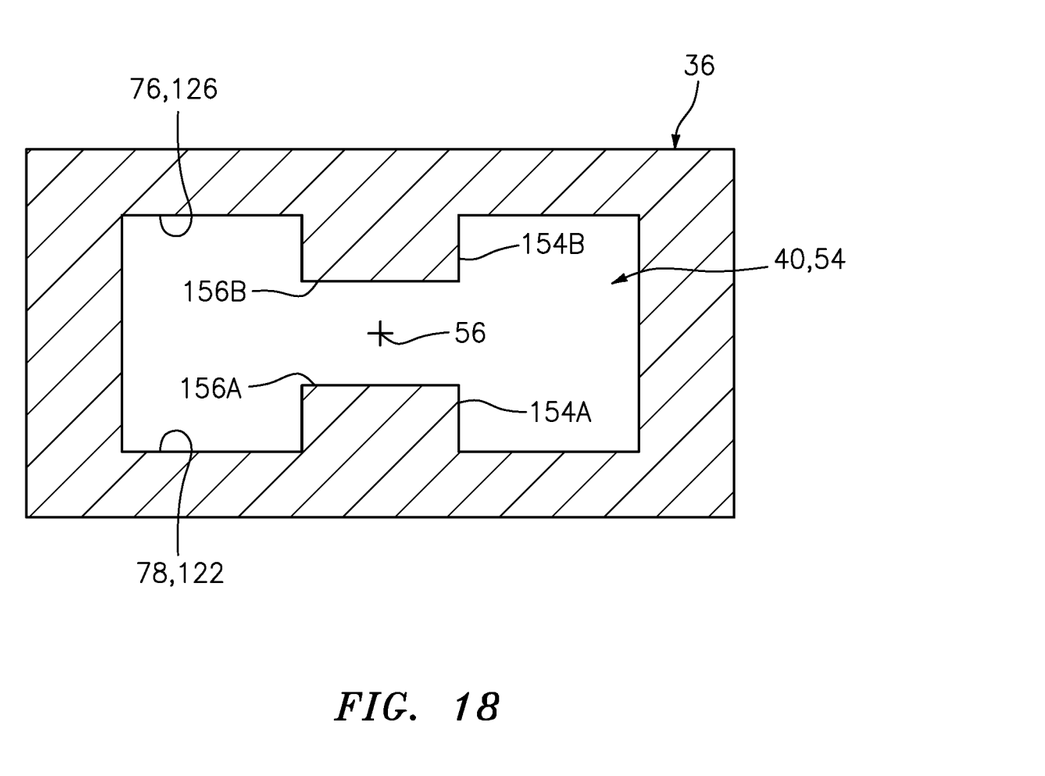
FIG. 18 is a cross-sectional illustration of a portion of the waveguide.

In some embodiments, referring to FIG. 18, at least a portion or an entirety of the internal waveguide channel 40 may be configured with a lobed cross-sectional geometry when viewed, for example, in a plane perpendicular to the longitudinal centerline 56 of a respective channel segment 54; e.g., plane of FIG. 18. The internal waveguide channel 40 of FIG. 18, for example, is configured with an H-shaped (or I-shaped) cross-sectional geometry. More particularly, the waveguide of FIG. 18 includes one or more lobes 154A and 154B (generally referred to as 154) (e.g., ribs, projections, etc.). Each of these lobes 154 may be configured to guide the electric, magnetic and/or electromagnetic signal waves through the internal waveguide channel 40 between the different transceivers 38 (see FIG. 1). The first lobe 154A (e.g., rib) of FIG. 18, for example, is arranged at the side 78 along the base surface 122. This first lobe 154A projects transversely partially into the internal waveguide channel 40 to a distal end 156A. The first lobe 154A extends longitudinally within the internal waveguide channel 40 along the respective longitudinal centerline 56. The second lobe 154B (e.g., rib) is arranged at the side 76 along the base surface 126. This second lobe 154B projects transversely partially into the internal waveguide channel 40 to a distal end 156B.

The second lobe 154B extends longitudinally within the internal waveguide channel 40 along the respective longitudinal centerline 56. The second lobe 154B may be arranged opposite (e.g., diametrically opposed to) and/or aligned with the first lobe 154A. The second lobe 154B may also or alternatively have the same cross-sectional geometry as the first lobe 154A at, for example, common locations along the longitudinal centerline 56. At least a portion (or an entirety) of one or more exterior and/or interior corners of each lobe 154 may be eased (e.g., rounded, bullnosed, chamfered, etc.; see FIG. 2). At least a portion (or an entirety) of one or more corners of each lobe 154 may also or alternatively be sharp (e.g., pointed, squared-off, etc.; see FIGS. 2 and 18). The present disclosure, however, is not limited to such exemplary waveguide channel cross-sectional geometries. For example, in other embodiments, the waveguide 36 may include a single lobe (e.g., rib), more than two lobes 154 (e.g., ribs) or the waveguide 36 may be configured without any lobes.

Figure 19:
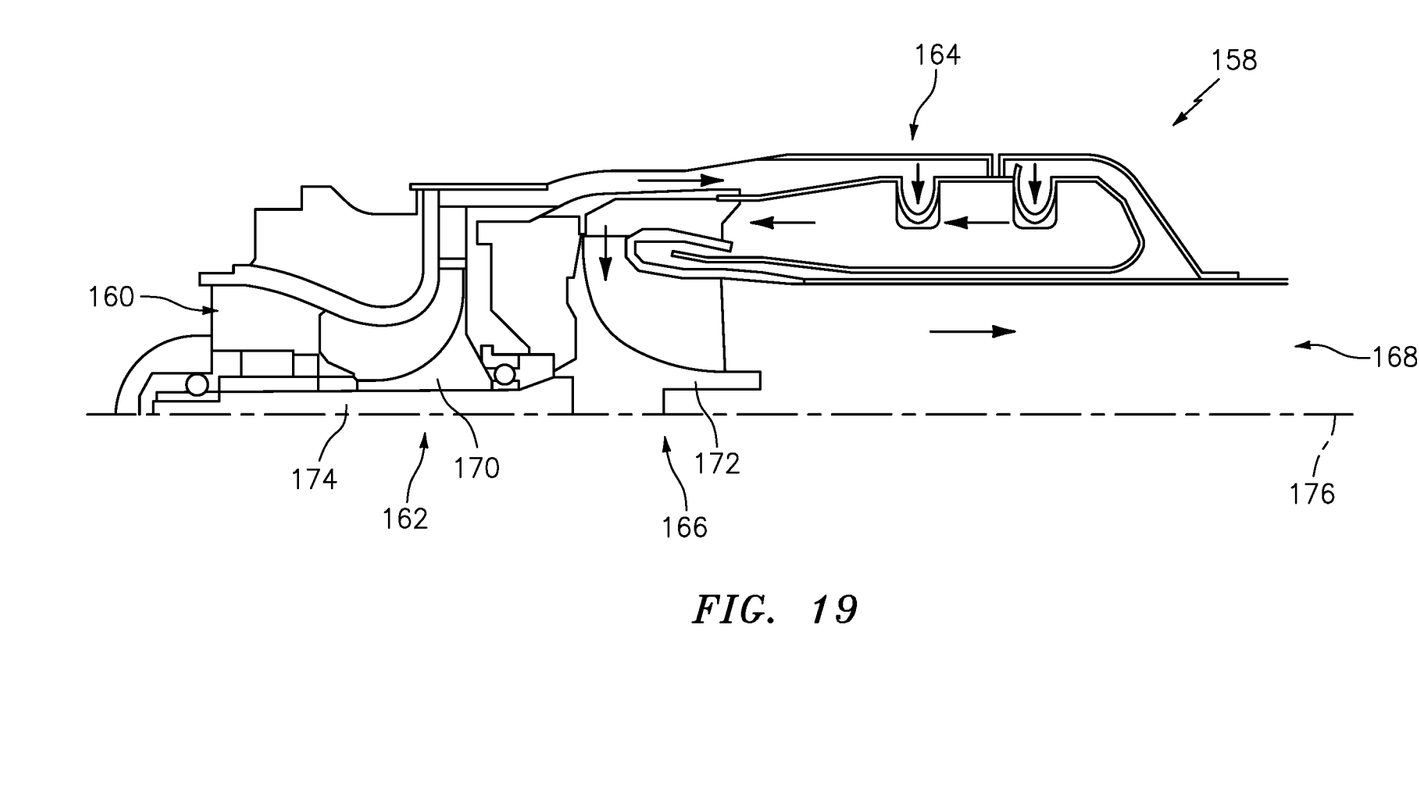
FIG. 19 is a side schematic illustration of a gas turbine engine.

The equipment operation system 30 of FIG. 1 may be configured with various types and configurations of equipment. FIG. 19 illustrates one such type and configuration of the equipment—a one-spool, radial-flow turbojet turbine engine 158 configured for propelling an unmanned aerial vehicle (UAV), a drone or any other aircraft or self-propelled projectile. In the specific embodiment of FIG. 19, the turbine engine 158 includes an upstream inlet 160, a (e.g., radial) compressor section 162, the combustor section 164, a (e.g., radial) turbine section 166 and a downstream exhaust 168 fluidly coupled in series. A compressor rotor 170 in the compressor section 162 is coupled with a turbine rotor 172 in the turbine section 166 by a shaft 174, which rotates about a centerline/rotational axis 176 of the turbine engine 158.

The equipment operation system 30 may be included in various turbine engines other than the one described above. The equipment operation system 30, for example, may be included in a geared turbine engine where a gear train connects one or more shafts to one or more rotors in a fan section, a compressor section and/or any other engine section. Alternatively, the equipment operation system 30 may be included in a turbine engine configured without a gear train. The equipment operation system 30 may be included in a geared or non-geared turbine engine configured with a single spool (e.g., see FIG. 19), with two spools, or with more than two spools. The turbine engine may be configured as a turbofan engine, a turbojet engine, a propfan engine, a pusher fan engine or any other type of turbine engine. The present disclosure therefore is not limited to any particular types or configurations of turbine engines. Furthermore, the present disclosure is not limited to turbine engine or aerospace applications. For example, the equipment operation system 30 may be configured with any piece of equipment which would benefit from communicating signals through the waveguide 36.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for signal communication, comprising:
a waveguide with an internal channel that includes a plurality of channel segments interconnected at a junction, the waveguide including a first surface and a second surface;
the first surface and the second surface partially forming a peripheral boundary of the internal channel at the junction, the first surface meeting the second surface at a first corner, and the first surface angularly offset from the second surface by an obtuse angle;
the waveguide further including a third surface further forming the peripheral boundary of the internal channel at the junction;
the third surface meeting the second surface at a second corner; and
the second surface angularly offset from the third surface by an angle between sixty four degrees and one hundred and sixteen degrees.

2. The apparatus of claim 1, wherein the obtuse angle is between one hundred and twenty two degrees and one hundred and forty eight degrees.

3. The apparatus of claim 1, wherein the obtuse angle is about one hundred and thirty five degrees.

4. The apparatus of claim 1, wherein the first corner is an interior inside corner.

5. The apparatus of claim 1, wherein at least a portion of the internal channel has a lobed cross-sectional geometry.

6. The apparatus of claim 1, wherein the angle is about ninety degrees.

7. The apparatus of claim 1, wherein the second corner is an interior inside corner.

8. The apparatus of claim 1, wherein the second corner is an outside corner.

9. The apparatus of claim 1, wherein
the waveguide further includes a fourth surface further forming the peripheral boundary of the internal channel at the junction;
the fourth surface meets the third surface at a third corner; and
the third surface is angularly offset from the fourth surface by an obtuse angle.

10. The apparatus of claim 9, wherein the first surface is parallel with the fourth surface.

11. The apparatus of claim 9, wherein the first surface is coplanar with the fourth surface.

12. The apparatus of claim 1, wherein the second surface partially forms a corner at the junction between a first of the plurality of channel segments and a second of the plurality of channel segments.

13. The apparatus of claim 1, further comprising:
a first transceiver; and
a second transceiver configured in signal communication with the first transceiver through the internal channel.

14. An apparatus for signal communication, comprising:
a waveguide including an internal channel and a notched corner;
the internal channel including a first channel segment and a second channel segment meeting the first channel segment at a junction;
the notched corner located at the junction;
the notched corner meeting a first sidewall surface partially forming the first channel segment at a first V-shaped interface; and
the notched corner meeting a second sidewall surface partially forming the second channel segment at a second V-shaped interface.

15. An apparatus for signal communication, comprising:
a waveguide including an internal channel, an indent feature and a sidewall;
the internal channel including a first channel segment, a second channel segment and a third channel segment that are interconnected at a junction;
the indent feature arranged at the junction opposite the second channel segment, the indent feature projecting out from the sidewall and having a tapered sectional geometry;
the indent feature including a first surface and a second surface that meets the first surface at a distal edge of the indent feature; and
the first surface angularly offset from the second surface by an angle between sixty four degrees and one hundred and sixteen degrees.

* * * * *